United States Patent
Joshi et al.

(10) Patent No.: US 6,264,466 B1
(45) Date of Patent: Jul. 24, 2001

(54) METHOD FOR INCREASING EFFICIENCY AND PRODUCTIVITY OF A FURNACE

(75) Inventors: Mahendra L. Joshi, Darien; Harley A. Borders, Lombard; Olivier Charon, Chicago, all of IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/540,919

(22) Filed: Mar. 31, 2000

Related U.S. Application Data

(63) Continuation of application No. 09/324,061, filed on Jun. 1, 1999.

(51) Int. Cl.⁷ .................................................. F23D 11/44
(52) U.S. Cl. ......................... 432/180; 431/215; 431/11; 431/180; 431/187
(58) Field of Search ........................... 432/179, 180, 432/181; 431/8, 11, 178, 180, 187, 215, 350

(56) References Cited

U.S. PATENT DOCUMENTS

| | | |
|---|---|---|
| 4,375,235 | 3/1983 | Tsai . |
| 4,539,035 | 9/1985 | Buckhardt et al. .................. 65/136 |
| 4,911,744 | 3/1990 | Petersson et al. .................. 65/136 |
| 5,587,283 | 12/1996 | Karinthi et al. ..................... 431/10 |
| 5,743,723 | 4/1998 | Iatrides et al. . |
| 5,772,427 | 6/1998 | Laurenceua et al. ............. 431/154 |
| 5,823,769 | 10/1998 | Joshi et al. . |
| 5,833,447 | 11/1998 | Bodelin et al. . |

FOREIGN PATENT DOCUMENTS

| | | | |
|---|---|---|---|
| 850883A2 | 7/1998 | (EP) | ........................................ 5/235 |
| 850883A3 | 7/1998 | (EP) | ........................................ 5/235 |
| WO97/36134 | 10/1997 | (WO) | ............................................. 6/4 |

Primary Examiner—Gregory Wilson
(74) Attorney, Agent, or Firm—Burns Doane Swecker & Mathis, LLP

(57) ABSTRACT

An oxygen enrichment system is provided which uses the existing air/fuel burners of a regenerative furnace to distribute additional oxygen to the burners for increased efficiency, and reduced nitrous oxide emissions. The centrally positioned cooling air lances in the burners of a regenerative furnace are modified to deliver oxygen when the burners are firing for oxygen enrichment. During the burner firing cycle, oxygen is delivered from an oxygen supply through the oxygen lance to provide a central oxygen jet. The fuel is delivered concentrically around the oxygen jet. During the non-firing cycle of the burner, cooling air or other cooling fluid is delivered from the cooling air supply through the oxygen jet for cooling the offside of the furnace.

4 Claims, 2 Drawing Sheets

METHOD FOR INCREASING EFFICIENCY AND PRODUCTIVITY OF A FURNACE

This application is a continuation of application Ser. No. 09/324,061, filed Jun. 1, 1999.

BACKGROUND OF THE INVENTION

1. Field of the Invention

The invention relates to a method and system for increasing the efficiency and productivity of a high temperature furnace, and more particularly, the invention relates to a device and method for operating air-fuel-fired burners in a furnace with oxygen enrichment for reducing Nitrous oxide emissions, increasing thermal efficiency, and improving productivity.

2. Brief Description of the Related Art

In known regenerative furnaces burner blocks having multiple firing ports are positioned on opposite sides or ends of the furnace combustion chamber. Each of the firing ports contains one or more burners for delivery of fuel into the combustion chamber. The firing ports also provide a combustion air supply around the burners. During furnace operation, the burners on opposite sides of the combustion chamber are operated alternately in a cyclic fashion. While the burners on one side of the combustion chamber are fired, cooling air is delivered to the opposite side of the combustion chamber. This cooling air is delivered through central lances positioned in each of the burners.

Regenerative furnaces have regenerators or refractory checkers on either side of the furnace. The regenerator checkers provide a heat transfer medium to transfer heat from the hot combustion gases exiting the combustion chamber to the cold combustion air which is delivered to the furnace. The regenerator checkers are heated to a high temperature by the hot exhaust gases at about 2900° F. to about 3000° F. which are passed from the top of the checkers to the bottom of the checkers at the exhaust side of the furnace for a cycle of approximately 20 minutes. During the next cycle, the combustion air being delivered to the furnace at ambient temperature is passes from the bottom of the preheated checker to the top of the checker for heat extraction. The combustion air is preheated to a temperature of about 2300° F. to about 2400° F. by the regenerator checker before it is delivered to the combustion chamber of the furnace. The combustion air and exhaust gas flows are reversed typically every 20 minutes so that each side checker can be alternately heated and used for preheating of combustion air.

Thermal efficiency of the regenerative furnaces may suffer due to an insufficient oxygen supply from a variety of causes. Insufficient oxygen supply may be caused by regenerator plugging, cracks in the regenerator, or other regenerator failure. Furnace efficiency can be improved in several different ways such as: 1) by installation of additional oxygen lances either under each of the burners or on one side of each of the burners; 2) by adding additional oxy-fuel burners to the sidewalls of the regenerative furnace; 3) by adding additional oxygen to the combustion air delivered to the firing ports, termed global oxygen enrichment; or 4) replacement of some of the fuel lances within dual fuel burners with additional oxygen lances.

However these solutions to insufficient oxygen supply all have substantial drawbacks. For example, it is often difficult to install additional oxygen lances or oxy-fuel burners in the furnace due to design or space constraints. The spaces where burners or lances can be placed are defined by burner geometry and improper placement can lead to quality problems, crown overheating, or regenerator hot spots that can dramatically reduce the useful life of the furnace. Often there is insufficient space for drilling holes for installation of the additional lances or burners at the desired locations beside or below the firing ports. In addition, refractory core drilling or refractory block removal to allow installation of the additional lances or burners can be physically impossible or at least very costly.

Global oxygen enrichment to improve efficiency is not an efficient solution in all circumstances. Often oxygen enrichment is required towards the end of the furnace life when the regenerators are plugged or severely damaged and are no longer delivering sufficient combustion oxygen even with oxygen enrichment of the combustion air. In most cases, additional heat is required in damaged areas where it is not possible to get the needed excess oxygen through the regenerators. In many cases, due to the inability to get oxygen where heat is required or the loss of oxygen through refractory cracks, the oxygen enrichment technique is unacceptable.

Accordingly, it would be desirable to provide a simple and economical system for oxygen enrichment of a refractory furnace.

SUMMARY OF THE INVENTION

The present invention relates to a system and method for injecting oxygen through existing air-fuel burners of a refractory furnace which requires only slight modification to the burners and no changes to the furnace refractory or furnace structure.

In accordance with one aspect of the present invention, an air-fuel-fired furnace includes a combustion chamber having a first side and a second side which operate alternately as a firing side and an exhaust side, a first regenerator, a plurality of first side ports connected to the first regenerator and to the first side of the combustion chamber, a second regenerator, and a plurality of second side ports connected to the second regenerator and to the second side of the combustion chamber. At least one burner is positioned in each of the first and second side ports. The burners each have a central oxygen/cooling lance and a concentric fuel nozzle surrounding the central oxygen/cooling lance. A cooling fluid and oxygen supply system supplies cooling fluid and oxygen to the central oxygen/cooling lances, and a control system alternately delivers oxygen and cooling fluid to the central oxygen/cooling lances on the first side and the second side depending on whether the side is operating as the firing side or the exhaust side.

In accordance with an additional aspect of the present invention, a method of retrofitting an air-fuel-fired furnace to provide oxygen enrichment includes the steps of:

- replacing the central cooling fluid lances of the burners in the air-fuel-fired furnace with oxygen/cooling lances having aerodynamic oxygen nozzles; and
- connecting the oxygen/cooling lances to a distribution system to supply oxygen and air alternately to the oxygen/cooling lances.

In accordance with a further aspect of the invention, a method of increasing efficiency and productivity of a furnace includes the steps of:

- providing an air-fuel-fired furnace having two sides provided with burners, the two sides alternating as firing and exhaust sides of the furnace;
- positioning a centrally located oxygen/cooling lance in an existing air-fuel-fired burner of the furnace to deliver oxygen to the firing side burners during firing of the burners; and using the centrally located oxygen/cooling lance to deliver cooling fluid to the air-fuel-fired burner when the burner is not firing.

The present invention provides an oxygen enrichment system and method with the advantages of increased productivity, increased efficiency, and minimized furnace emissions.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

The oxygen enrichment system according to the present invention uses the existing air-fuel burners of a regenerative furnace to distribute additional oxygen for increased thermal efficiency, increased productivity, and reduced Nitrous oxide emissions. According to the present invention, the centrally positioned cooling air lances in the burners of a regenerative furnace are modified to deliver oxygen when the burners are firing for oxygen enrichment. The modification of the lances includes the upgrading of the lance material to be suitable for oxygen use, the addition of a distribution tee to a backside of the lance, the addition of check valves, the addition of improved air line filters, and the addition of an oxygen nozzle to control oxygen delivery.

Figure 1:
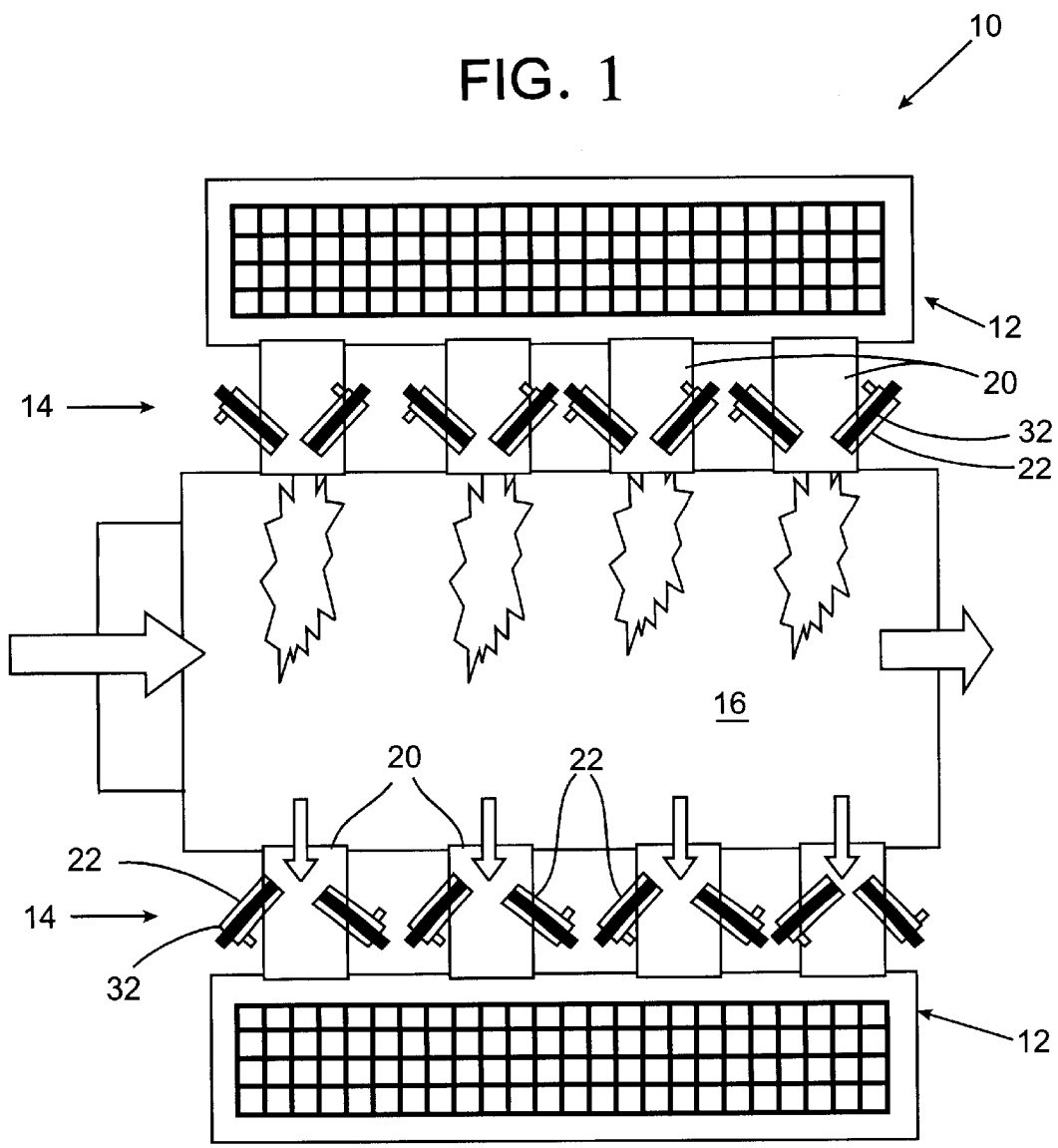
FIG. 1 is a schematic view of a regenerative furnace according to the present invention which includes an oxygen enrichment system.

FIG. 1 illustrates a regenerative furnace 10 having regenerator checkers 12 on opposite sides. Burner blocks 14 are positioned between the regenerator checkers 12 and a combustion chamber 16 of the furnace. The burner blocks 14 each include a plurality of firing ports 20 with each of the firing ports having two side mounted burners 22. Combustion air is delivered through the firing ports 20 from the regenerator checkers 12 during firing of the burners 22. The combustion air passing around the burners 22 is often insufficient to provide the oxygen required for efficient combustion. The present invention provides oxygen enrichment by delivering additional oxygen through the burners 22 themselves.

In order to use the off side central cooling air lances of a regenerative furnace for oxygen enrichment, the existing lances in the typical air-fuel burners are replaced with oxygen/cooling fluid lances 32 which are constructed of upgraded materials suitable for oxygen service. Examples of suitable materials include Inconel, 310-SS, other high temperature alloys, or the like which counter thermal radiation and oxygen use. The oxygen/cooling fluid lances 32 are positioned in the center of each of the burners 22 with the fuel gas delivered concentrically around the lance.

Figure 2:
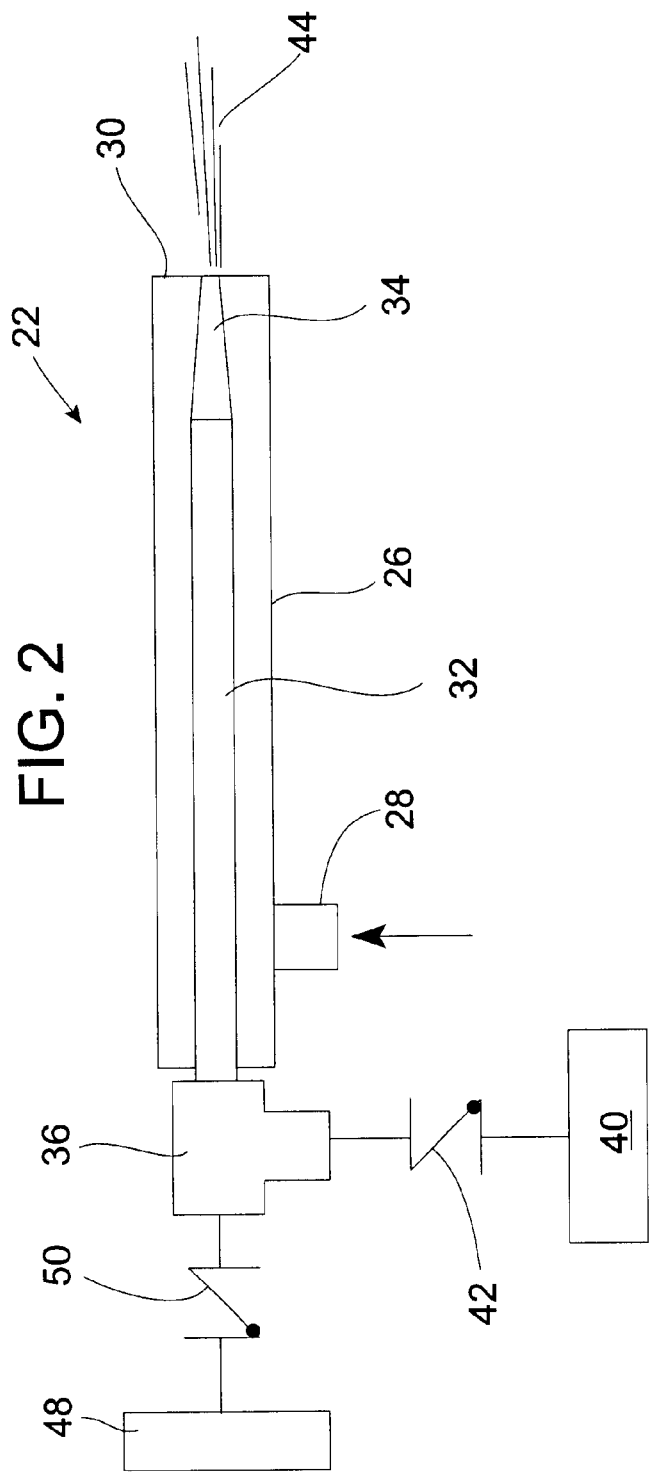
FIG. 2 is a schematic side view of a burner with an added oxygen lance.

An enlarged view of one of the burners 22 is shown in FIG. 2. The burners 22 include a burner body 26 having a fuel inlet 28 and a fuel outlet 30. Positioned within the burner body 26 is the oxygen/cooling fluid lance 32. A front end of the oxygen/cooling lance 32 is connected to an oxygen/cooling nozzle 34 and a back end of the lance is connected to a gas distribution tee 36 for delivery of both oxygen and cooling air thorough the lance. Preferably, the lance 32 is threaded at both ends to receive the specially designed oxygen tip 34 and the gas distribution tee 36.

During the burner firing cycle, oxygen is delivered from an oxygen supply 40 through a check valve 42 and through the oxygen lance 32 to provide a central oxygen jet 44. The fuel is delivered concentrically around the oxygen jet 44 by the burner body 26. During the non-firing cycle of the burner 22, cooling air is delivered from a cooling air supply 48 through a check valve 50 and through the oxygen lance 32 for cooling of the off-side of the furnace. The check valves 42, 50 are installed to prevent backflow of either air or oxygen. The cooling air piping also will preferably include a final filter to prevent any lubricating oil or particulate contamination from entering the lance. Alternate delivery of oxygen when the burner 22 is firing and cooling air when the burner is not firing is coordinated by a flow control skid with gas distribution manifolds. The flow of oxygen and cooling air will be coordinated with the combustion cycle of the furnace by a control system of the furnace.

Figure 3:
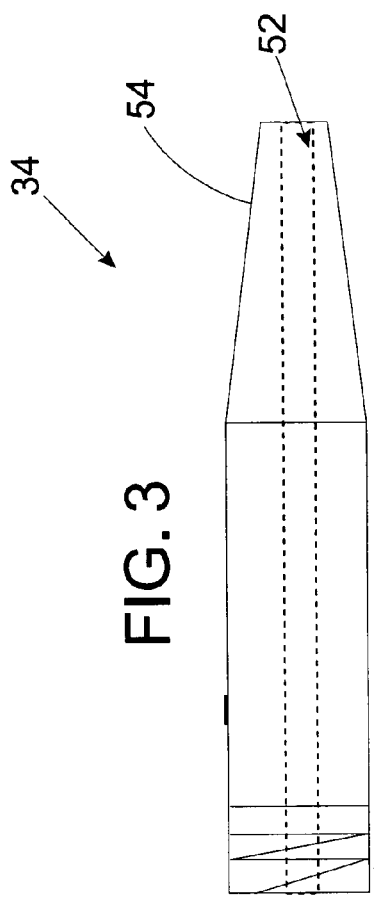
FIG. 3 is a side view of an oxygen nozzle.

The lance tip or nozzle 34, shown in FIG. 3, is designed to control the mixing of natural gas or other fuel and oxygen. A diameter of the interior bore 52 provides a desired oxygen injection velocity while the exterior aerodynamic configuration provides a smooth intersection of the fuel and oxygen streams during mixing. Preferably, an external taper 54 of the nozzle forms an angle of less than about 10° with an axis of the nozzle to achieve a gradual mixing of oxygen and fuel. More preferably, the angle formed by the external taper 54 and the nozzle axis is less than about 7°. The nozzle 34 is formed of a high temperature material, such as standard high temperature alloy steel, or the like.

The oxygen injection velocity, as determined by the size of the nozzle bore 52, is preferably about 100 ft/sec to about 800 ft/sec and is chosen to match the fuel velocity from the existing air-fuel-fired burner. The burner fuel velocity may vary depending on the burner firing mode, such as, side-of-port, under-port, over-port, through-port, etc. By controlling the oxygen velocity, the overall gas dynamics and the resulting flame development within the firing ports 20 will not be appreciably changed. The control of the oxygen velocity is used to minimize combustion of the oxygen and fuel within the burner block 14 and to avoid over-heating of the interior of the firing port 20 due to oxy-fuel combustion.

Although the present invention has been described as employing an off-side cooling air stream, the cooling media may be any one of many suitable cooling fluids. For example, the cooling fluid may be air, nitrogen, steam, and even oxygen in small amounts such as 200–600 scfh.

EXAMPLE

According to one example of an oxygen enrichment system according to the present invention, the oxygen concentration of combustion air is increased from about 20.9% to about 22.5%. With natural gas injected at 1000 Btu/cf through a 5 MMBtu/hr air-fuel-fired burner and combustion air delivered at the required stoichiometry through the combustion air port 20, this system will require about 900 scfh of oxygen delivered through the central oxygen lance. This amounts to about 7.8% oxygen for the overall stoichiometric combustion. The level of oxygen enrichment can be anywhere from about 3% to about 50% of the total oxygen requirement for the port. The oxygen pressure will be controlled to between about 1 and about 25 psig with gas velocities within the oxygen pipes maintained below about 100 ft/sec for safety reasons. The products of this incomplete oxy-fuel combustion (rich combustion) initiated with a natural gas jet core due to the injection of oxygen may contain an increased level of soot precursor formation that will subsequently lead to a more luminous flame in the furnace.

The system according to the present invention provides advantages of increased efficiency, lower peak-flame temperatures, and reduced Nitrous oxide emissions. The thermal efficiency can improve due to increased heat transfer to the load. An estimate based on laboratory tests indicates about 3% to about 5% improvement in heat transfer and thus reduction in fuel usage. The nitrous oxide emissions can decrease by about 10% to about 30% depending on the level of oxygen enrichment. The very luminous primary flame provided by cracking of natural gas into soot particles results in improved heat transfer. In addition, the oxygen-enriched combustion solves regenerator capacity problems by allowing reduced flue gas volume.

Although the present invention is particularly useful for side-fired regenerative glass furnaces, it may also be used in other types of furnaces including end-fired furnaces, unit melters, and all air-fuel fired furnaces such as ladle preheaters, rotary kilns (cement and lime) and heat treatment furnaces. The present invention can be used for all modes of firing including side-of-port, under-port, over-the-port, through-port, and others.

While the invention has been described in detail with reference to the preferred embodiments thereof, it will be apparent to one skilled in the art that various changes and modifications can be made and equivalents employed, without departing from the present invention.

What is claimed is:

1. A method of increasing efficiency and productivity of a furnace comprising:

providing an air-fuel-fired furnace having two sides provided with burners, the two sides alternating as firing and exhaust sides of the furnace;

positioning a centrally located oxygen/cooling lance in an existing air-fuel-fired burner of the furnace to deliver oxygen to the firing side burners during firing of the burners; and using the centrally located oxygen/cooling lance to deliver cooling fluid to the air-fuel-fired burner when the burner is not firing.

2. The method of claim 1, wherein the air-fuel-fired furnace is a regenerative glass furnace.

3. The method of claim 1, wherein oxygen delivered through the centrally located oxygen/cooling lance during firing of the burners is between about 3% and about 50% of the total oxygen requirement for a given port and burner configuration.

4. The method of claim 1, wherein the delivery of oxygen to the firing side burners increases an oxygen concentration of combustion air in the furnace by about 3% and about 50%.

* * * * *